United States Patent
Holme

(10) Patent No.: US 10,205,155 B2
(45) Date of Patent: Feb. 12, 2019

(54) HIGH SURFACE AREA ANODE WITH VOLUME EXPANSION FEATURES

(71) Applicant: QuantumScape Corporation, San Jose, CA (US)

(72) Inventor: Timothy Holme, Mountain View, CA (US)

(73) Assignee: QuantumScape Corporation, San Jose, CA (US)

(*) Notice: Subject to any disclaimer, the term of this patent is extended or adjusted under 35 U.S.C. 154(b) by 343 days.

(21) Appl. No.: 14/881,566

(22) Filed: Oct. 13, 2015

(65) Prior Publication Data

US 2016/0104891 A1    Apr. 14, 2016

Related U.S. Application Data

(60) Provisional application No. 62/063,877, filed on Oct. 14, 2014.

(51) Int. Cl.

| | |
|---|---|
| *H01M 4/13* | (2010.01) |
| *H01M 4/134* | (2010.01) |
| *H01M 4/62* | (2006.01) |
| *H01M 4/66* | (2006.01) |
| *H01M 4/80* | (2006.01) |
| *H01M 10/052* | (2010.01) |
| *H01M 10/056* | (2010.01) |

(52) U.S. Cl.
CPC .......... *H01M 4/13* (2013.01); *H01M 4/134* (2013.01); *H01M 4/625* (2013.01); *H01M 4/626* (2013.01); *H01M 4/661* (2013.01); *H01M 4/663* (2013.01); *H01M 4/667* (2013.01); *H01M 4/808* (2013.01); *H01M 10/052* (2013.01); *H01M 10/056* (2013.01); *H01M 2300/0068* (2013.01); *H01M 2300/0082* (2013.01); *H01M 2300/0085* (2013.01)

(58) Field of Classification Search
None
See application file for complete search history.

(56) References Cited

U.S. PATENT DOCUMENTS

| | | | |
|---|---|---|---|
| 2009/0311567 A1* | 12/2009 | Visco | H01M 2/1673 429/403 |
| 2014/0117291 A1 | 5/2014 | Amatucci et al. | |
| 2014/0170493 A1 | 6/2014 | Holme et al. | |

(Continued)

FOREIGN PATENT DOCUMENTS

| | | |
|---|---|---|
| WO | WO/2014/186634 A2 | 11/2014 |
| WO | WO 2015/006144 A1 | 1/2015 |

(Continued)

OTHER PUBLICATIONS

Crowther, Owen et al., "Effect of Electrolyte Composition on Lithium Dendrite Growth," Journal of The Electrochemical Society, 2008, vol. 155, No. 11, pp. A806-A811.

(Continued)

*Primary Examiner* — Wyatt P McConnell
(74) *Attorney, Agent, or Firm* — Squire Patton Boggs (US) LLP

(57) ABSTRACT

A high surface area anode structure for a lithium ion secondary battery including an anolyte layer, wherein the anolyte layer includes vacant space formed within a percolating network for lithium deposition thereupon.

25 Claims, 10 Drawing Sheets

(56) References Cited

U.S. PATENT DOCUMENTS

| 2014/0186708 A1 | 7/2014 | Pereira et al. |
| 2014/0234715 A1 | 8/2014 | Fasching et al. |
| 2015/0099188 A1* | 4/2015 | Holme .............. H01M 10/0525 429/231.95 |

FOREIGN PATENT DOCUMENTS

| WO | WO/2015/054320 A2 | 4/2015 |
| WO | WO/2015/076944 A1 | 5/2015 |
| WO | WO 2015/130831 A1 | 9/2015 |

OTHER PUBLICATIONS

Ding, Fei et al., "Dendrite-Free Lithium Deposition via Self-Healing Electrostatic Shield Mechanism," J. Am. Chem. Soc., 2013, vol. 135, pp. 4450-4456.

Gireaud, L. et al., "Lithium metal stripping/plating mechanisms studies: A metallurgical approach," Electrochemistry Communications, 2006, vol. 8, pp. 1639-1649.

Jow, T.R. et al., "Interface Between Solid Anode and Solid Electrolyte-Effect of Pressure on Li/LiI ($Al_2O_3$) Interface," Solid Sate and Ionics 9 & 10, 1983, pp. 695-698.

Kanamura, Kyoshi et al., "Electrochemical Deposition of Very Smooth Lithium Using Nonaqueous Electrolytes Containing HF," J. Electrochem. Soc., Jul. 1996, vol. 143, No. 7, pp. 2187-2197.

Li, Nian-wu et al., "An Artificial Solid Electrolyte Interphase Layer for Stable Lithium Metal Anodes," Adv. Mater., 2015, pp. 1-6.

Lu, Yingying et al., "Stable Lithium Electrodeposition in Liquid and Nanoporous Solid Electrolytes," School of Chemical and Biomolecular Engineering, Cornell University, Ithaca, New York, 2014, 30 pages.

Mukherjee, Rahul et al., "Defect-induced plating of lithium metal within porous graphene networks," Nature Communications, 2014, pp. 1-10.

Peled, E. et al., "Advanced Model for Solid Electrolyte Interphase Electrodes in Liquid and Polymer Electrolytes," J. Electrochem. Soc., Aug. 1997, vol. 144, No. 8, pp. L208-L210.

Tu, Zhengyuan et al., "Nanostructured Electrolytes for Stable Lithium Electrodeposition in Secondary Batteries," Acc. Chem. Res., 2015, XXXX, XXX, XXX-XXX, 10 pages.

Wilkinson, D.P. et al., "In-situ study of electrode stack growth in rechargeable cells at constant pressure," J. Electroanal. Chem., 1993, vol. 355, pp. 193-203.

Yan, Kai, "Ultrathin Two-Dimensional Atomic Crystals as Stable Interfacial Layer for Improvement of Lithium Metal Anode," Nano Lett., 2014, vol. 14, pp. 6016-6022.

Zheng, Guangyuan et al., "Interconnected hollow carbon nanospheres for stable lithium metal anodes," Nature Nanotechnology, 2014, pp. 1-6.

* cited by examiner

Top down

Li // Celgard + QS11 // AAO(+Pt)//Cu

HIGH SURFACE AREA ANODE WITH VOLUME EXPANSION FEATURES This application claims priority to U.S. Provisional Patent Application No. 62/063,877 filed Oct. 14, 2015 entitled HIGH SURFACE AREA ANODE WITH VOLUME EXPANSION FEATURE, the entire contents of which are incorporated by reference herein for all purpose in their entirety.

BACKGROUND OF THE INVENTION

1. Field of the Invention

This invention relates to anodes for lithium (Li) ion secondary batteries.

2. Description of the Related Art (Note: This application references a number of different publications as indicated throughout the specification by one or more reference numbers within brackets, e.g., [x]. A list of these different publications ordered according to these reference numbers can be found below in the section entitled "References." Each of these publications is incorporated by reference herein.)

High energy density solid state Li ion secondary batteries, having a Li metal negative electrode (anode), are limited with respect to their performance due to volume changes in the anode during charging and discharging as well as due to the formation of Li dendrites. These volume changes that occur when the battery is operated can lead to cracks and other related mechanical failures that limit performance. Li plating, for example in the battery negative electrode, can result in Li dendrites, which can grow between the negative electrode and the positive electrode and through the electrolyte causing an electrical short therebetween and leading to catastrophic failure of the battery.

One or more embodiments of the present invention describe novel and inventive high surface area anode structures that address these problems and others.

SUMMARY OF THE INVENTION

In some embodiments, set forth herein is a high surface area anode (negative electrode) for a lithium (Li) ion secondary battery, comprising: a current collector (CC) layer comprising a metal selected from the group consisting of copper (Cu), aluminum (Al), nickel (Ni), steel, stainless steel, alloys, coatings thereof upon other substrates, and combinations thereof; and an anolyte between and in contact with both the CC layer and a solid state electrolyte (SSE) layer. The anolyte comprises a liquid or gel that is stable or self-stabilizing versus Li (stable v. Li), pore space for Li deposition, and a percolating network comprising at least one member selected from the group consisting of a binder, carbon, a polymer, nanoparticles, nanowires, and combinations thereof.

In some other embodiments, set forth herein is a high surface area anode (negative electrode) for a lithium (Li) ion secondary battery, comprising: a current collector (CC) layer comprising a metal selected from the group consisting of copper (Cu), aluminum (Al), nickel (Ni), steel, stainless steel, alloys, coatings thereof upon other substrates, and combinations thereof; and an anolyte between and in contact with both the CC layer and a solid state electrolyte (SSE) layer. The anolyte comprises a liquid or gel that is stable versus Li (stable v. Li), a high surface area space for Li deposition, and a percolating network comprising at least one member selected from the group consisting of a binder, carbon, a polymer, nanoparticles, nanowires, and combinations thereof.

In some embodiments, the density of the SSE can be >95% and ≤100%.

The SSE can be selected from the group consisting of Li stuffed garnet, $Li_{10}SiP_2S_{12}$, LXPS, LSPS, LSTPS, LSTPSO, LPS, LPSO, doped LPS (doped with Germanium (Ge), Silicon (Si), Tin (Sn) or combinations thereof), $Li_2S$—$SiS_2$ (LSS), $Li_2S$—$SnS_2$, $Li_2S$—$SnS_2$ doped with $As_2S_3$, LATP (a Li—Al—Sn—P including material), LAGP (a Li—Al—Ga—P including material) and a solid polymer electrolyte (SPE), for example. The SSE may be produced by an evaporative process wherein the precursors are vaporized and subsequently condensed and deposited to form the recited material. As used herein, the letter "e" placed before the SSE material (e.g., eLSPS) refers to the SSE material fabricated using an evaporative process. The SSE may comprise a composite blend of a polymer and one of the above ceramics.

As used herein "LSPS," refers to an electrolyte material having Li, Si, P, and S chemical constituents. As used herein "LSTPS," refers to an electrolyte material having Li, Si, P, Sn, and S chemical constituents. As used herein, "LSPSO," refers to LSPS that is doped with, or has, O present. In some examples, "LSPSO," is a LSPS material with an oxygen content between 0.01 and 10 atomic %.

As used herein, "LATP," refers to an electrolyte material having Li, Al, Sn, and P chemical constituents. As used herein "LAGP," refers to an electrolyte material having Li, Al, Ga, and P chemical constituents.

As used herein, "LPS," refers to an electrolyte having Li, P, and S chemical constituents. As used herein, "LPSO," refers to LPS that is doped with or has O present. In some examples, "LPSO," is a LPS material with an oxygen content between 0.01 and 10 atomic %.

As used herein, "LXPS," refers to an electrolyte material characterized by the formula $Li_aMP_bS_c$ (M=Si, Ge, Al, and/or Sn). LSPS refers to an electrolyte material characterized by the formula $Li_aSiP_bS_c$, where 2≤a≤8, 0.5≤b≤2.5, 4≤c≤12. Example LXPS materials are found, for example, in International PCT Patent Application No. PCT/US14/38283, which application is incorporated by reference herein. When M is Sn and Si—both are present—the LXPS material is referred to as LSTPS. As used herein, "LSTPSO," refers to LSTPS that is doped with, or has, O present. In some examples, "LSTPSO," is a LSTPS material with an oxygen content between 0.01 and 10 atomic %.

As used herein, LPS refers to an electrolyte material characterized by the formula $Li_xP_yS_z$ where 0.33≤x≤0.67, 0.07≤y≤0.2 and 0.4≤z≤0.55. LPS also refers to an electrolyte characterized by a product formed from a mixture of $Li_2S$:$P_2S_5$ wherein the ratio is 10:1, 9:1, 8:1, 7:1, 6:1 5:1, 4:1, 3:1, 7:3, 2:1, or 1:1. LPS also refers to an electrolyte characterized by a product formed from a mixture of $Li_2S$:$P_2S_5$ wherein the reactant or precursor amount of $Li_2S$ is 95 atomic % and $P_2S_5$ is 5 atomic %. LPS also refers to an electrolyte characterized by a product formed from a mixture of $Li_2S$:$P_2S_5$ wherein the reactant or precursor amount of $Li_2S$ is 90 atomic % and $P_2S_5$ is 10 atomic %. LPS also refers to an electrolyte characterized by a product formed from a mixture of $Li_2S$:$P_2S_5$ wherein the reactant or precursor amount of $Li_2S$ is 85 atomic % and $P_2S_5$ is 15 atomic %. LPS also refers to an electrolyte characterized by a product formed from a mixture of $Li_2S$:$P_2S_5$ wherein the reactant or precursor amount of $Li_2S$ is 80 atomic % and $P_2S_5$ is 20 atomic %. LPS also refers to an electrolyte characterized by a product formed from a mixture of $Li_2S:P_2S_5$ wherein the reactant or precursor amount of $Li_2S$ is 75 atomic % and $P_2S_5$ is 25 atomic %. LPS also refers to an electrolyte characterized by a product formed from a mixture of $Li_2S:P_2S_5$ wherein the reactant or precursor amount of $Li_2S$ is 70 atomic % and $P_2S_5$ is 30 atomic %. LPS also refers to an electrolyte characterized by a product formed from a mixture of $Li_2S:P_2S_5$ wherein the reactant or precursor amount of $Li_2S$ is 65 atomic % and $P_2S_5$ is 35 atomic %. LPS also refers to an electrolyte characterized by a product formed from a mixture of $Li_2S:P_2S_5$ wherein the reactant or precursor amount of $Li_2S$ is 60 atomic % and $P_2S_5$ is 40 atomic %.

As used herein, LPSO refers to an electrolyte material characterized by the formula $Li_xP_yS_zO_w$, where $0.33 \leq x \leq 0.67$, $0.07 \leq y \leq 0.2$, $0.4 \leq z \leq 0.55$, $0 \leq w \leq 0.15$. Also, LPSO refers to LPS, as defined above, that includes an oxygen content of from 0.01 to 10 atomic %. In some examples, the oxygen content is 1%. In other examples, the oxygen content is 2%. In some other examples, the oxygen content is 3%. In some examples, the oxygen content is 4%. In other examples, the oxygen content is 5%. In some other examples, the oxygen content is 6%. In some examples, the oxygen content is 7%. In other examples, the oxygen content is 8%. In some other examples, the oxygen content is 9%. In some examples, the oxygen content is 10%.

As used herein, LSS refers to an electrolyte material characterized by the formula $Li_xSi_yS_z$ where $0.33 \leq x \leq 0.5$, $0.1 \leq y \leq 0.2$, $0.4 \leq z \leq 0.55$, and it may include up to 10 atomic % oxygen. LSS also refers to an electrolyte material comprising Li, Si, and S. In some examples, LSS is a mixture of $Li_2S$ and $SiS_2$. In some examples, the ratio of $Li_2S:SiS_2$ is 90:10, 85:15, 80:20, 75:25, 70:30, 65:35, 60:40, 55:45, or 50:50.

As used herein, the phrase "lithium stuffed garnet" refers to garnet materials such as oxide compounds that are characterized by a crystal structure related to a garnet crystal structure. Garnets may include lithium-stuffed garnet compounds having the formula $Li_ALa_BM'_CM''_DZr_EO_F$, $Li_ALa_BM'_CM''_DM_EO_F$, or $Li_ALa_BM'_CM''_DNb_EO_F$, wherein $4<A<8.5$, $1.5<B<4$, $0 \leq C \leq 2$, $0 \leq D \leq 2$; $0 \leq E<2$, $10<F<13$, and M' and M'' are each, independently in each instance, selected from Al, Mo, W, Nb, Sb, Ca, Ba, Sr, Ce, Hf, Rb, or Ta. Garnets may include lithium-stuffed garnet compounds having the formula $Li_aLa_bZr_cAl_dMe''_eO_f$, wherein $5<a<7.7$, $2<b<4$, $0<c \leq 2.5$, $0 \leq d<2$, $0 \leq e<2$, $10<f<13$, and Me'' is a metal selected from Nb, Ta, V, W, Mo, or Sb, and as described herein. Garnets, as used herein, may also include those garnets described above that are doped with $Al_2O_3$. Garnets, as used herein, may also include those garnets described above that are doped so that $Al^{3+}$ substitutes for another element in the garnet structure, e.g., $Li^+$ or $Zr^{4+}$. As used herein, garnet includes, but is not limited to, $Li_{7.0}La_3(Zr_{t1}+Nb_{t2}+Ta_{t3})O_{12}+0.35Al_2O_3$ wherein (t1+t2+t3=subscript 2) so that the La:(Zr/Nb/Ta) ratio is 3:2. Also, garnet herein includes, but is not limited to, $Li_xLa_3Zr_2O_{12}+yAl_2O_3$, wherein x ranges from 5.5 to 9 and y ranges from 0 to 1. In some examples x is 7 and y is 1.0. Also, garnet herein includes, but is not limited to, $Li_xLa_3Zr_2O_{12}+yAl_2O_3$. Example lithium stuffed garnet materials are found, for example, in International PCT Patent Application Nos. PCT/US2014/059575 and PCT/US2014/059578, which applications are incorporated by reference herein.

As used herein, garnet does not include YAG-garnets (known as yttrium aluminum garnets, or $Y_3Al_5O_{12}$). As used herein, garnet does not include silicate-based garnets such as pyrope, almandine, spessartine, grossular, hessonite, or cinnamon-stone, tsavorite, uvarovite and andradite and the solid solutions pyrope-almandine-spessarite and uvarovite-grossular-andradite. Garnets as used herein do not include nesosilicates having the general formula $X_3Y_2(SiO_4)_3$ wherein X may include Ca, Mg, Fe, and Mn; Y may include Al, Fe, and Cr.

As used herein, a "cell volume expansion compensation element," refers to a device or mechanism, including but not limited to a spring, a foam piece, a foam structure, a gas bladder, a fluid bladder, or a clamp that maintains a pressure on a battery cell stack. This element helps to maintain a uniform pressure within or around the anolyte by applying pressure through the stack. In some examples, the spring, foam, or clamp is compressible and expandable so that the battery cell maintains a uniform pressure during the operation (i.e., charge-discharge) of the battery cell. As used herein, a stack includes the layers between the current collectors, such as but not limited to, the cathode layer, the electrolyte layer, the anolyte layer, and the anode.

The materials described herein are suitable for use with a variety of cathode or positive electrode active materials, such as, but not limited to, those active materials set forth in U.S. Nonprovisional patent application Ser. No. 13/922,214, entitled NANOSTRUCTURED MATERIALS FOR ELECTROCHEMICAL CONVERSION REACTIONS, filed Jun. 19, 2013 (issued as U.S. Pat. No. 9,692,039, on Jun. 27, 2017); also U.S. Nonprovisional patent application Ser. No. 14/272,518, entitled PROTECTIVE COATINGS FOR CONVERSION MATERIAL CATHODES, filed May 8, 2014 (issued as U.S. Pat. No. 9,543,564, on Jan. 10, 2017); also U.S. Provisional Patent Application No. 62/027,908, entitled HYBRID ELECTRODES WITH BOTH INTERCALATION AND CONVERSION MATERIALS, filed Jul. 23, 2014; and also U.S. Nonprovisional patent application Ser. No. 14/090,990, entitled Iron Oxyfluoride Electrodes for Energy Storage, filed Nov. 26, 2013 issued as U.S. Pat. No. 8,951,668, on Feb. 10, 2015); also U.S. Nonprovisional patent application Ser. No. 14/063,966, entitled METAL FLUORIDE COMPOSITIONS FOR SELF-FORMED BATTERIES, filed Oct. 25, 2013 (issued as U.S. Pat. No. 9,048,497, on Jun. 2, 2015). The content of these patent applications is herein incorporated by reference in their entirety for all purposes.

The materials described herein are also suitable for use with other catholyte and electrolyte materials such as, but not limited to, those catholyte and electrolyte materials set forth in International PCT Patent Application No. PCT/US14/38283, entitled SOLID STATE CATHOLYTE OR ELECTROLYTE FOR BATTERY USING $Li_AMP_BS_C$ (M=Si, Ge, and/or Sn), filed May 15, 2014 (published as WO/2014/186634, on Nov. 20, 2014).

Active electrode material suitable for use with the components, devices, and methods set forth herein include, without limitation, NCA (lithium nickel cobalt aluminum oxide), NMC (lithium nickel manganese cobalt oxide), LMNO (lithium manganese nickel oxide), LCO (lithium cobalt oxide, i.e., $LiCoO_2$), nickel fluoride ($NiF_x$, wherein x is from 0 to 2.5), copper fluoride ($CuF_y$, wherein y is from 0 to 2.5), or $FeF_z$ (wherein z is selected from 0 to 3.5). In certain embodiments, the active electrode material is a material for a cathode. In certain embodiments, the active cathode electrode material is NCA (lithium nickel cobalt aluminum oxide). In certain other embodiments, the active cathode electrode material is LMNO (lithium manganese nickel oxide). In yet other embodiments, the active cathode electrode material is LCO (lithium cobalt oxide, i.e., $LiCoO_2$). In yet other embodiments, the active cathode electrode material is NMC. In still certain other embodiments, the active cathode electrode material is nickel fluoride ($NiF_x$, wherein x is from 0 to 2.5). In some other embodiments, the active cathode electrode material is copper fluoride ($CuF_y$, wherein y is from 0 to 2.5). In certain other embodiments, the active cathode electrode material is or $FeF_z$ (wherein z is selected from 0 to 3.5).

The solid polymer electrolyte (SPE) may comprise PEO, PEG, polysiloxane, polyphosphazene, PEO-MEEGE, PEO-AGE-MEEGE, alkylsilane ethers with carbon spacer groups between the silicon atom and the oligo(ethylene oxide) moiety, and/or block-copolymers thereof, and other SPEs known in the art.

The percolating network can comprise nanowires. The nanowires can be carbon nanowires (e.g., electron conducting carbon nanowires). The nanowires can be selected from the group consisting of insulating carbon nanowires, cellulosic fibers, and insulating oxides (e.g., ZnO, $SiO_2$, and/or $Al_2O_3$). The nanowires can be insulating and either springy or stiff. In some examples, the nanowires are compressible, malleable, or expandable. In some examples, the nanowires are compressible or expandable without breaking or degrading mechanically.

The percolating network can comprise nanoparticles (e.g., copper, nickel, or carbon nanoparticles) thereupon. The percolating network can comprise carbon selected from the group consisting of graphite, vapor grown carbon fiber (VGCF), ketjen black, carbon nanofibers mats, and carbon nanowires.

The negative electrode/percolating network may comprise a carbon foam, carbon mesh, expanded metal mesh, or the like.

The anolyte may be an organic liquid solvent, or combinations of solvents, that have low viscosity and high permittivity such that they may dissolve a salt of lithium such as LiBOB, LiBETI, LiDFOB, $LiBF_4$, LiFSI, LiTFSI, $LiPF_6$, $LiClO_4$, $LiAsF_6$, or other functionally equivalent salts. The solvents may include propylene carbonate (PC), ethylene carbonate (EC), dimethyl carbonate (DMC), diethyl carbonate (DEC), ethyl methyl carbonate (EMC), 1,2-dialkoxyethane (DAE), dibutoxy ethylene (DBE), dimethoxyethane (DME), diethoxyethylene (DEE), 1,3-dioxolane, 1,2-dimethoxyethane, acetonitrile, tetrahydrofuran (THF), a glyme, ethers, and other solvents known in the art. The anolyte may further include additives known to improve the plating and stripping of lithium, for example $CsPF_6$, $RbPF_6$, $N_2O$, $SO_2$, $CO_2$, $LiNO_3$, $Li_2S_8$, HF, VC, FEC, 2Me-F, or functionally equivalent compositions. The anolyte may be a gel of a polymer swollen by the liquid electrolyte. For example, the polymer component of the gel may be polyethylene oxide (PEO), poly(vinylidenefluoride-hexafluoropropylene (PVDF-HFP), polyacrylonitrile (PAN), polymethyl methacrylate (PMMA), LPMASQ, and other polymers known to swell or gel with liquids, and the solvent/salt system may be any of the above.

The plating surfaces in the negative electrode may be covered by a stiff solid material known to improve lithium plating, for example LiF, BN, $Li_2O$, $Li_2S$, LiI, $Li_3N$, $Li_3P$, or poly(vinylene carbonate-co-acrylonitrile).

In some examples, a polymer binder is used to bind nanoparticles and/or nanowires. The binder can also optionally bind nanowires and/or nanoparticles, to a current collector. The percolating network can have an electronic conductivity ($\sigma_e$) that is less than $10^{-1}$ or $10^{-2}$ or $10^{-3}$ Siemens per centimeter (S/cm). In some examples, the percolating network can have an electronic conductivity ($\sigma_e$) that is less than $1 \times 10^{-4}$ Siemens per centimeter (S/cm). The negative electrode can be characterized by having a $\sigma_e < \sigma_{Li}$, where $\sigma_{Li}$ is the conductivity of $Li^+$. In some examples, the $\sigma_e$ is less than $\sigma_{Li}$ by one order of magnitude or more. In some examples, the $\sigma_e$ is less than $\sigma_{Li}$ by two orders of magnitude or more. In some examples, the $\sigma_e$ is less than $\sigma_{Li}$ by three orders of magnitude or more.

The polymer (e.g., polymer binder) can be selected from the group consisting of poly(ethylene oxide) (PEO), styrene-butadiene, polystyrene (PS), poly(phenylene oxide) (PPO), or related polymer binders. In some examples, the polymer is selected from a group consisting of polyethylene oxide (PEO), polypropylene oxide (PPO), PEO-PPO block co-polymers, styrene-butadiene, polystyrene (PS), acrylates, diacrylates, methyl methacrylates, silicones, acrylamides, t-butyl acrylamide, styrenics, t-alpha methyl styrene, acrylonitriles, and vinyl acetates. In some examples, the polymer is polyethylene oxide (PEO). In some examples, the polymer isopolypropylene oxide (PPO). In some examples, the polymer is a PEO-PPO block co-polymer. In some examples, the polymer is styrene-butadiene. In some examples, the polymer is polystyrene (PS). In some examples, the polymer is an acrylate. In some examples, the polymer is a diacrylate. In some examples, the polymer is a methyl methacrylate. In some examples, the polymer is a silicone. In some examples, the polymer is an acrylamide. In some examples, the polymer is t-butyl acrylamide. In some examples, the polymer is a styrenic. In some examples, the polymer is t-alpha methyl styrene. In some examples, the polymer is an acrylonitrile. In some examples, the polymer is a vinyl acetate. In some examples, the polymer is styrene butadiene rubber (SBR), nitrile butadiene rubber (NBR), ethylene propylene rubber (EPR), PVdF, PVdF-HFP copolymer, PAA, PVA, or other binders known in the art.

The liquid anolyte can be separated from the SSE by a member selected from the group consisting of a gasket, a seal, and a membrane, or other functionally equivalent sealing components or compositions.

The pore or high surface area space can comprise pore walls coated with a metal (e.g., Platinum (Pt), Paladium (Pd), Ni, or Cu). For example, the pores may be those pores in anodized alumina and the walls of these pores can be coated with carbon and/or a metal, such as but not limited to Pt, which alloys with Li. The metal can be such that an overpotential of the battery is reduced by a factor of at least 4.5 as compared to that without the metal. A battery comprising the negative electrode can have a Coulombic Efficiency of greater than 90%.

The battery can comprise anode, cathode, and electrolyte materials such that the battery has a capacity of greater than 300 milliamp hours per gram (mAh/g) at 30 millivolts (mV).

The anode architectures described herein can be used with positive electrode (cathode) comprising materials set forth in U.S. patent application Ser. No. 13/922,214, entitled NANOSTRUCTURED MATERIALS FOR ELECTROCHEMICAL CONVERSION REACTIONS, filed Jun. 19, 2013 (issued as U.S. Pat. No. 9,692.039, on Jun. 27, 2017); U.S. patent application Ser. No. 14/063,966, entitled METAL FLUORIDE COMPOSITIONS FOR SELF FORMED BATTERIES, filed Oct. 25, 2013 (issued as U.S. Pat. No. 9,048,497, on Jun. 2, 2015), and U.S. Provisional Patent Application No. 62/038,059, entitled DOPED CONVERSION MATERIALS FOR SECONDARY BATTERY CATHODES, filed Aug. 15, 2014, which applications are incorporated by reference herein.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

Example 1

Figure 1:
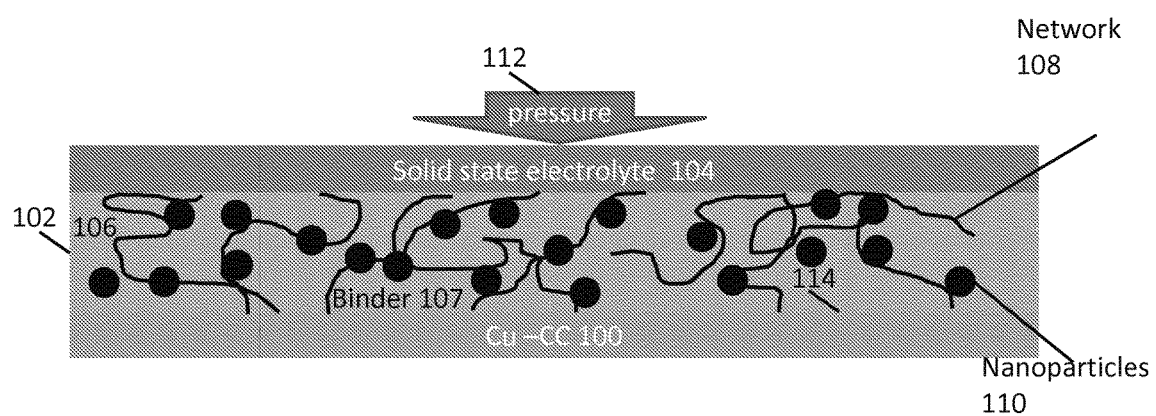
FIG. 1 is a cross-sectional schematic of a negative electrode structure according to an example but non-limiting first embodiment of the invention.

FIG. 1 illustrates an anode for a Li ion secondary battery, comprising a copper CC layer 100 and an anolyte layer 102. The anolyte layer 102 is between and in contact with both the CC layer and a SSE layer 104. The SSE layer 104 is in contact with a positive electrode (not shown).

The anolyte layer 102 comprises a percolating network and a liquid or gel electrolyte 106 (stable to Li) percolating through the percolating network. The percolating network includes a binder 107, an electronically conductive network 108 (comprised of conductive carbon in an example), and nanoparticle (carbon based, e.g., graphite or carbon, or metal based, e.g., Cu or Pt) 110 attached to the carbon conductive network 108.

Pressure 112 is applied to the anode structure to improve the Coulombic efficiency of cycling of the structure. It may enhance Coulombic efficiency by improving the contact to Li during stripping or to encourage Li growth onto the nanoparticles 110 (the nanoparticles providing a high surface-area surface (or space) for Li to plate onto) rather than through the SSE. The extra anode volume occupied by the nanoparticles 110 can be offset by a reduction in the cell volume expansion compensation element.

The anolyte layer 102 may have a $\sigma_e < \sigma_{Li}$, e.g., in order to encourage Li plating from the bottom of the anolyte layer (side 114 of the anolyte layer 102 closest to the CC).

Example 2

Figure 2:
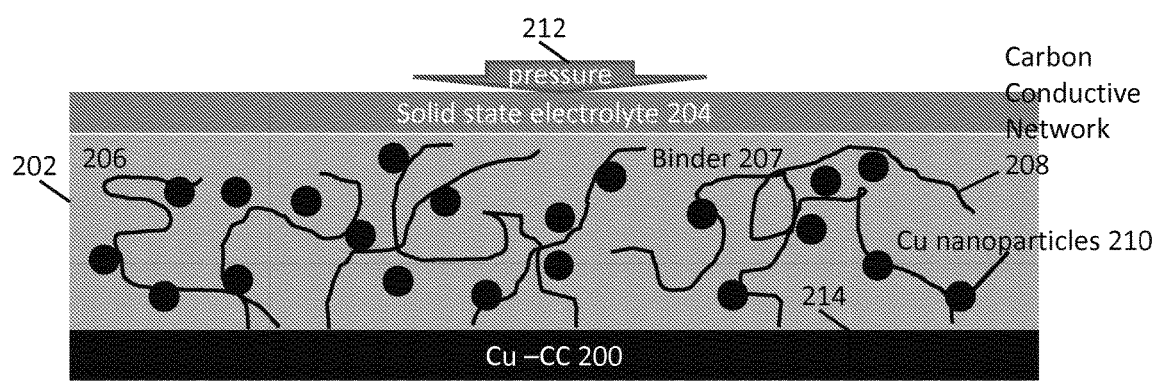
FIG. 2 is a cross-sectional schematic of a negative electrode structure according to an example but non-limiting second embodiment of the invention.

FIG. 2 illustrates an anode structure comprising a CC layer 200 and an anolyte layer 202 on the CC layer 200, wherein the SSE layer 204 (e.g., garnet) is in contact with a positive electrode (not shown), the anolyte layer 202 comprises a liquid electrolyte 206 and a percolating network, and the percolating network includes a binder 207, a carbon conductive network 208, and Cu nanoparticles 210 attached to the carbon conductive network 208. The liquid electrolyte 206 (stable to Li) percolates through the percolating network.

Pressure 212 is applied to the anode structure, e.g., to encourage efficient Li stripping when the battery is discharged (the negative electrode providing free or pore space for Li to plate into). The anolyte layer 202 has $\sigma_e < \sigma_{Li}$, e.g., in order to encourage Li plating from the bottom 214 of the anolyte layer 202. The binder 208 has $\sigma_e < 1 \times 10^{-3}$ S/cm.

The anode structure of Example 2 can provide for increased battery voltage as compared to the battery voltage using the anode structure of Example 1. For example, the battery capacity using the anode structure of Example 2 does not sacrifice ~30 mV due to lithium intercalation into carbon in the first ~380 mAh/g.

Example 3

Figure 3:
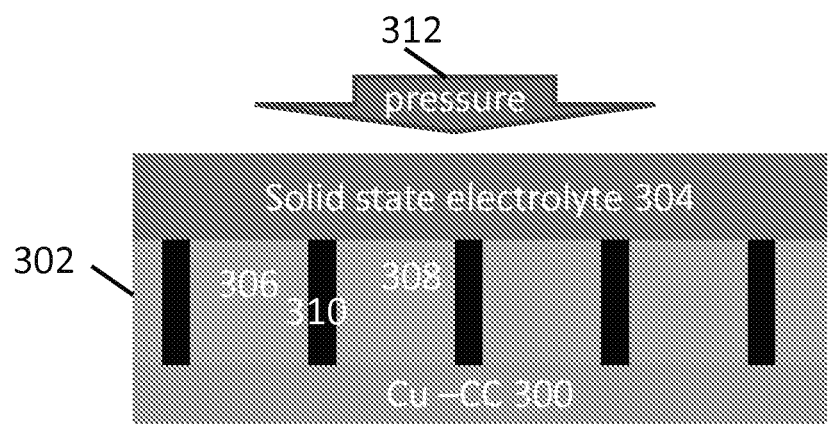
FIG. 3 is cross-sectional schematic of a negative electrode structure according to an example but non-limiting third embodiment of the invention.

FIG. 3 illustrates an anode structure comprising a CC layer 300 and an anolyte layer 302 on the CC layer 300, wherein the SSE layer 304 (e.g., garnet) is in contact with a positive electrode (not shown), the anolyte layer 302 comprises a liquid or gel electrolyte 306 (stable to Li) and a percolating network, and the percolating network includes a porous structure having pores 308 and pore walls 310 extending from the CC layer 300 to the SSE 304. The pore walls 310 comprise stiff insulating material, e.g. nanowires.

Pressure 312 is applied to the anode structure, e.g., to encourage Li growth into free or pore space 308 rather than lifting up the SSE 304 by plating at the junction between the nanowires and the SSE.

Example 4

Figure 4A:
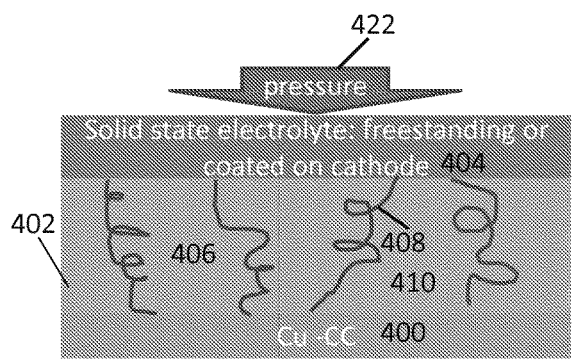
FIGS. 4(*a*)-(*b*) are cross-sectional schematics of a negative electrode structures according to example but non-limiting fourth and fifth embodiments of the invention.

FIG. 4(*a*) illustrates a springy anode structure for a Li ion secondary battery, comprising a Cu CC layer 400 and a springy anolyte layer 402. The anolyte layer 402 is between and in contact with both the CC layer 400 and a SSE layer 404, and the anolyte layer 402 comprises a percolating network and an electrolyte 406 percolating through the percolating network.

The percolating network includes springy insulating or conductive nanowires 408 (e.g., semiconducting carbon nanotubes, oxide nanowires) extending from the CC 400 to the SSE 404, wherein the nanowires 408 define a porous structure or anode matrix having pores 410. In FIG. 4(*a*), the SSE layer 404 is freestanding or coated on, or bonded to, the battery cathode (i.e., positive electrode).

FIG. 4(*b*) illustrates a springy anode structure for a Li ion secondary battery, comprising a Cu CC 412 and a percolating network 414 comprising carbon mat, carbon mesh, or carbon foam (possibly made of carbon nanofibers) wetted with anolyte or electrolyte 416, wherein the carbon mat 414 defines a porous structure or anode matrix having pores 418. In FIG. 4(*b*), the SSE layer 420 comprises a free standing garnet film. The anolyte 416 does not fill the volume of the negative electrode, leaving free porosity for lithium plating.

Pressure 422, 424 is applied to the anode structures to encourage Li growth into free or pore space 410, 418 rather than through the SSE 404, 420. The pressure compresses the carbon mat during lithium stripping to allow contact to substantially all the plated lithium and enable a high Coulombic efficiency.

The springy anode structures can increase Li stripping efficiency and/or Coulombic efficiency ($\eta_C$) in the battery (e.g., as compared to Example 3).

Thus, FIGS. 1-4 illustrate examples of a high surface area anode (i.e., negative electrode) for a Li ion secondary battery, comprising: a current collector (CC) layer 100, 200, 300, 400, 412 comprising a metal selected from the group consisting of copper (Cu), aluminum (Al), nickel (Ni), Platinum (Pt), stainless steel, alloys, and combinations thereof; an anolyte layer 102, 202, 302, 402, 414-416 between and in contact with both the CC layer and a SSE layer 104, 204, 304, 404, 420; wherein the anolyte layer comprises a liquid or gel that is stable v. Li; and the anolyte layer comprises pore space 308, 410, 418 for Li deposition and a percolating network. The percolating network can comprise at least one member selected from the group consisting of a binder, carbon 414, a polymer, nanoparticles 110, 210 (e.g., having a diameter less than 1 micrometer), nanowires 408, and combinations thereof.

Characterization

Anolyte Structure

Figure 7:
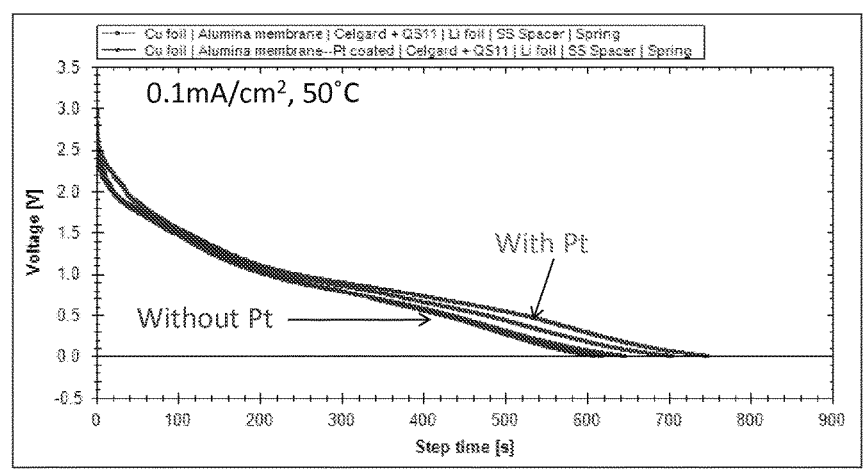
FIG. 7 plots initial discharge of the testing structure of FIG. 6, for the AAO pore walls coated with Pt (red) and without Pt (blue), according to embodiments of the invention.
Figure 8:
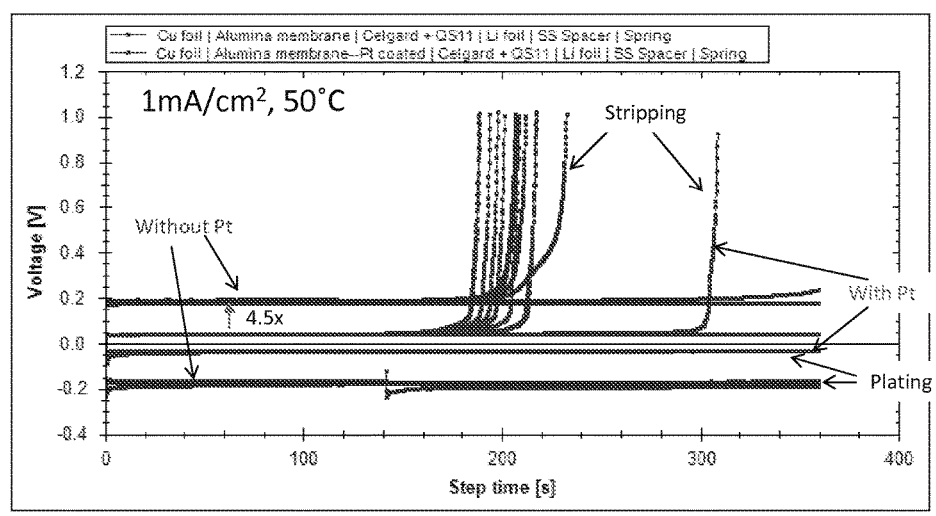
FIG. 8 shows a plot of plating and stripping overpotential of the testing structure of FIG. 6, for the AAO pore walls coated with Pt (red) and without Pt (blue), according to an example but nonlimiting embodiment of the invention.
Figure 9:
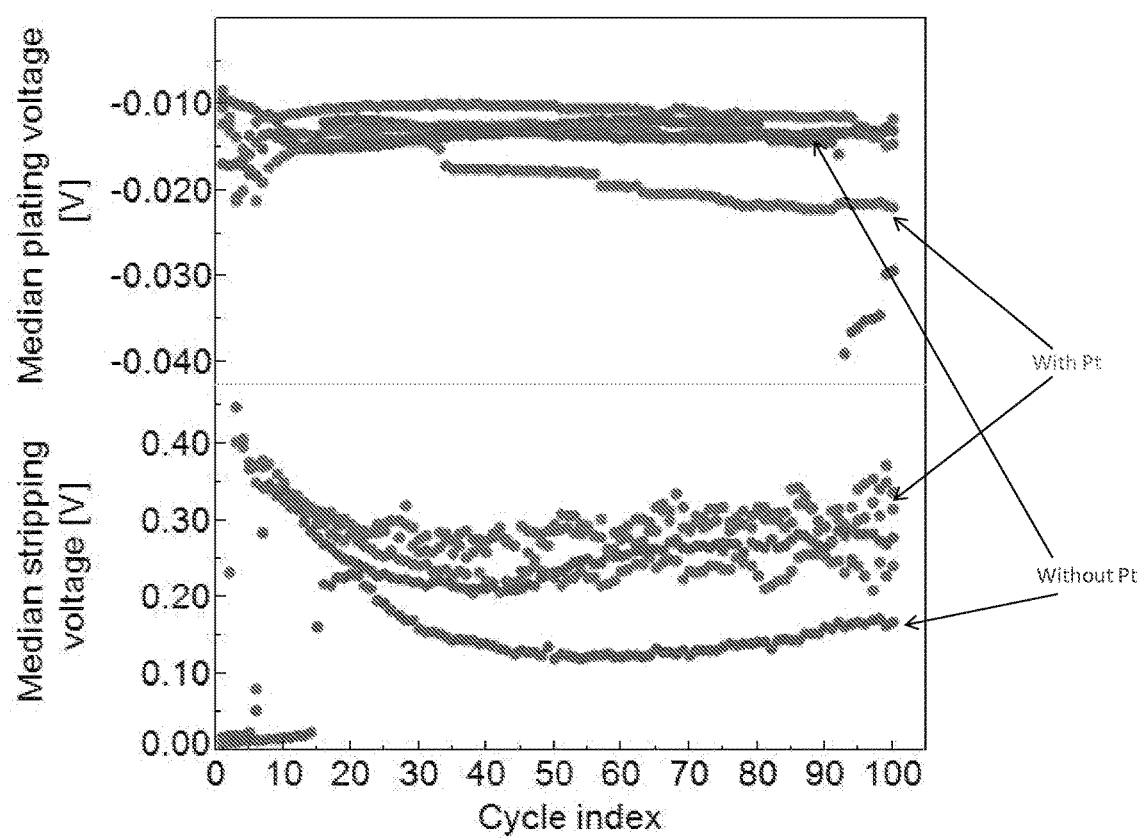
FIG. 9 shows a plot of Voltage (V) versus Cycle for stripping and plating the testing structure of FIG. 6 and showing an improved Coulombic efficiency ($\eta_C$) for the AAO with Pt as compared to AOO without Pt.

The performance of anode structures according to embodiments of the invention has been characterized by plating and stripping Li into pores in a porous structure comprising an anodic alumina (AAO) membrane infiltrated with liquid electrolyte. Discharging and overpotential measurements, as illustrated in FIGS. 7-9, were performed using an electrolyte comprising ethylene carbonate (EC): propylene carbonate (PC)+LiPF$_6$.

FIGS. 5(a)-(c) illustrate the AAO structure is a membrane having a thickness of approximately 60 micrometers, comprising pore walls 500 that are 20-40 nanometers (nm) thick, pores 502 that are 90-170 nm in diameter, and a platinum coating 504 having a nominal thickness of 7 nm on the inside of the pore walls.

Figure 5:
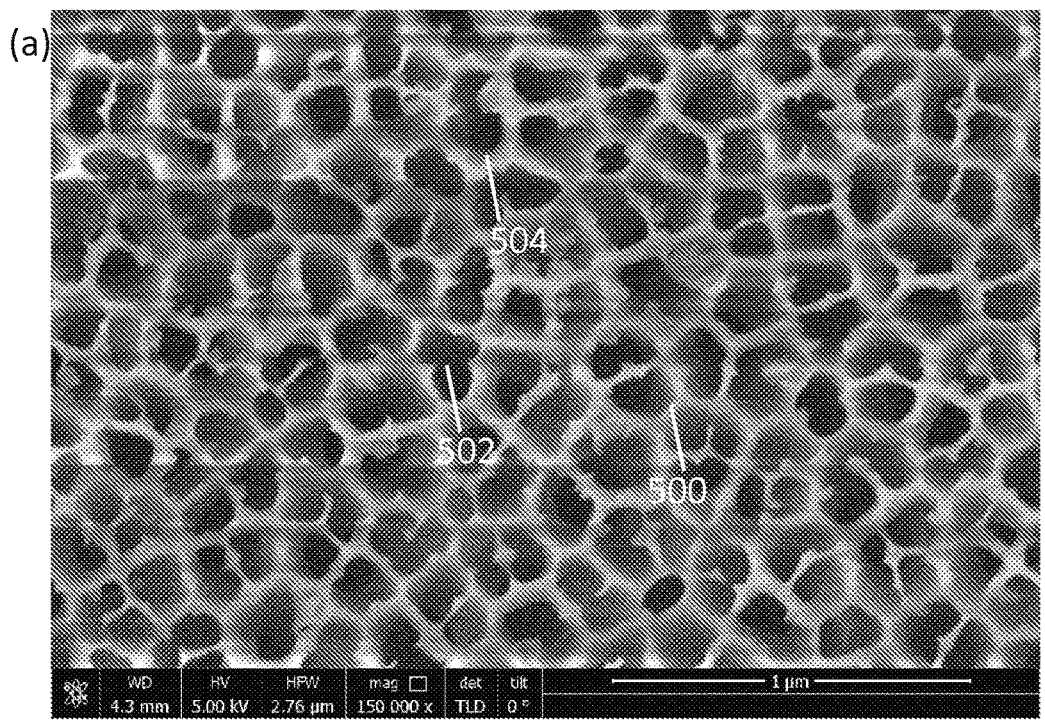
FIG. 5 shows scanning electron microscope (SEM) images of an anodized alumina (AAO) anode structure according an embodiment of the invention, showing top view (a) and cross-sectional views in (b) and (c). Scale bar is 1 µm in (a), 2 µm in (b), and 50 µm in (c).
Figure 5:
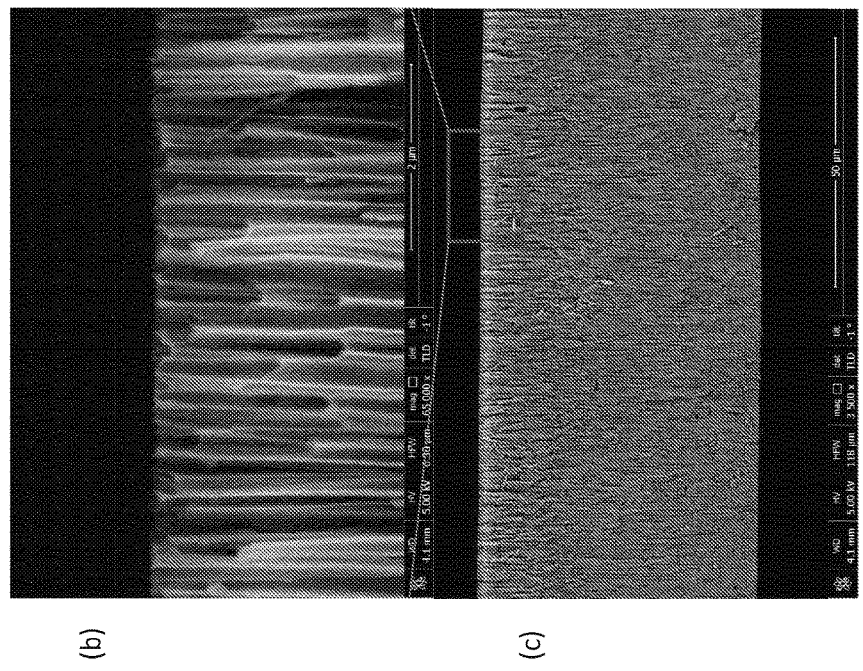
Figure 6:
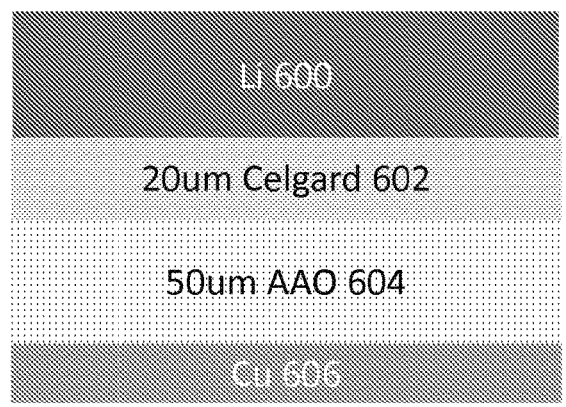
FIG. 6 is a cross-sectional schematic of a testing structure for testing anode performance, according to example but non-limiting embodiments of the invention.

FIG. 6 illustrates a testing structure for testing the anode structure, comprising a Li foil reference electrode 600, 20 micrometer thick porous insulating material (Celgard layer 602), the AAO membrane 604 (50 micrometers thick) of FIG. 5, and Copper CC foil 606. The AAO membrane 604 is an anolyte layer comprising liquid electrolyte and the percolating network having a porous structure with pores 502 and pore walls 500 extending from the CC to 606 the SSE, similar to Example 3. In one or more embodiments, the pore walls 500 of the AAO 604 are coated with Platinum (Pt); in other embodiments, the pore walls are not coated with Pt. Li can then be plated into and stripped from the pores in AAO membrane infiltrated with liquid electrolyte.

Discharging

FIG. 7 illustrates initial discharging of the battery structure of FIG. 6, plotting measured voltage between the Li reference electrode 600 and CC 606 as a function of time, for the AAO membrane 604 having a Pt coating and for the AAO membrane without Pt coating. FIG. 7 shows higher capacity (approximately 15% more capacity at a voltage less than 1 V) for the AAO membrane with the Pt coating, as compared to the AAO membrane without Pt coating the pore walls. The data of FIG. 7 was obtained for a discharging current density of 0.1 mA/cm$^2$ and at a temperature of 50° C. The measurements were taken with a stainless steel (SS) spacer on the Li foil 600 and a spring applying pressure to the battery structure via the spacer.

The larger capacity with Pt as compared to without Pt can result from the Li alloying with the Pt.

FIG. 7 also shows that metal (Pt) incorporated into the porous structure leads to a higher discharge voltage as Li from the reference electrode 600 moves through the Celgard and onto the Pt.

Plating/Stripping Overpotential

FIG. 8 illustrates plating/stripping overpotential of the battery structure in FIG. 6, plotting measured overpotential between the Li reference electrode 600 and CC 606 as a function of time, for the AAO membrane 604 having a Pt coating (red curves) and for the AAO membrane without Pt coating (blue curves) for 6 cycles of plating/stripping. FIG. 8 shows reduced overpotential (4.5 times less) for the AAO membrane 604 with the Pt coating as compared to the AAO membrane without the Pt coating the pore walls. The stripping overpotentials are positive voltages, the plating overpotentials are negative voltages, and the overpotentials are voltages measured vs. Li/Li+ (with respect to a voltage (0 V). A lower overpotential for plating when the AAO is coated with Pt demonstrates that a larger surface area is active for Li plating. The strategy of providing a higher conductive surface area for lithium plating has successfully reduced the overpotential required to plate and strip lithium.

The data of FIG. 8 was obtained for a charging/discharging current density of 1 mA/cm$^2$ and at a temperature of 50° C.

The data of FIG. 9 was obtained for a charging/discharging current density of 1 mA/cm$^2$, 100×6 min, and at a temperature of 50° C.

FIG. 9 illustrates plating/stripping overpotential of the battery structure in FIG. 6, plotting measured Voltage (V) between the Li reference electrode 600 and CC 606 as a function of Cycle, for the AAO membrane 604 having a Pt coating (red curves) and for the AAO membrane without Pt coating (blue curves) for plating/stripping. FIG. 9 shows an improved (i.e., higher) Coulombic efficiency ($\eta_C$) for the AAO with Pt as compared to AOO without Pt coating the pore walls. This improved Coulombic efficiency ($\eta_C$) is demonstrated by the reduction in hysteresis between plating and stripped as shown by the smaller Voltage difference between the Pt coating (red) curves as compared to the without Pt coating (blue) curves As shown in FIGS. 8-9, the lower overvoltage (or lower voltage difference between plating and stripping voltages) for the embodiment with Pt indicates a lower Li-Area Specific Resistance (Li-ASR) as compared to the embodiment without Pt.

The lower Li-ASR indicates a lower tendency for Li dendrites to form. Dendrites of Li are less likely to form in the porous anode architecture according to one or more embodiments of the invention because there is more free volume in the porous anode architecture than would be present in a traditional Li/solid electrolyte plate configuration (less energy is required to plate Li into a pore/free volume as compared to plating Li into a solid electrolyte and physically pushing the solid electrolyte apart).

Advantages and Risks Mitigated

The anode structures according to embodiments of the invention (e.g., as illustrated in Examples 1-4) can solve or mitigate problems or risks as compared to conventional architecture (such as swelling, dendriting or Li dendrite formation, and high Li-ASR).

Conventional batteries can swell and contract as metallic Li intercalates and de-intercalates. In contrast, in one or more embodiments described herein, the porosity and/or high surface area network built into the anode structures provides higher surface area, (Li plates onto pores (e.g., nanopores) or nanoparticles instead of onto a surface of the anolyte/anode layer). Provision of porosity in the negative electrode is not considered for typical lithium metal anodes, which are usually fully dense metallic lithium. This provision of porosity, which is filled by lithium plating, reduces volume expansion at the stack level (negative electrode/electrolyte/positive electrode), which therefore reduces the requirement to compensate for this volume expansion at a cell or module level, providing significant advantages in complexity, cost, and reliability.

In one or more embodiments of the present invention, the higher surface area offered by the porous structures also reduces the Li-ASR, lowering plating overpotential for a given Li-ASR, and suppressing (e.g., eliminating) formation of dendrites as compared to conventional anodes in Li-ion batteries. The lower ASR enables a battery to run more efficiently and produce higher power.

Figure 4B:
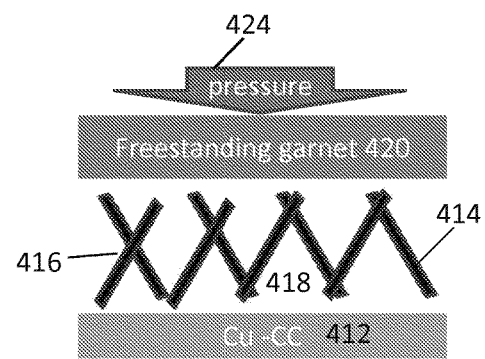

When the negative electrode has the ability to shrink when lithium is stripped from the negative electrode, as in FIG. 4(b), Coulombic efficiency of the battery is higher, which enables a longer battery lifetime.

In addition, one or more embodiments of the invention provide an anolyte having $\sigma_e < \sigma_{Li}$ that can mitigate Li plating into the electrolyte, thereby also preventing dendriting.

The anode structures according to embodiments of the invention (e.g., as illustrated in Examples 1-4) can solve or mitigate one or more added risks that have been identified and that may result from the implementation of a porous structure, as illustrated in Table 1.

TABLE 1

| Added Risks | Added Risk Mitigation |
| --- | --- |
| Li dendriting around the edge of SSE. | The SSE (e.g., eLSPS) on the cathode must present a harder growth path (higher energy) than the liquid anolyte. Good edge sealing can also be provided. |
| Li may plate on the top surface and continue plating from there through the SSE. | Applied pressure should encourage Li growth into free space rather than through the SSE. For example, dense garnet can be used as the SSE to apply the pressure. |
| Low $\eta_C$ due to side-reactions of the anolyte with Li. | Use a liquid with some stability vs. Li, such as ethylene carbonate (EC): propylene carbonate (PC) + LiPF$_6$ or other electrolytes that are at least as stable. |
| May require SSE to be free-standing or coated on cathode. | Free-standing garnet can be used, for example. Examples 1 and 2 could use PEO. |
| Extra Anode volume. | Offset by the reduction in spring volume (cell-level volume expansion compensation element) provided by the porous structure |
| Low $\eta_c$ due to broken dendrites and inaccessible Li. | Use a compressible anode matrix, as illustrated in Example 4. |
| Where can the liquid electrolyte go when Li plating expands into the anode. | Headspace or other volume in the battery cell can be provided. A garnet SSE can be used in such embodiments, for example. A small volume of anolyte may be provided that leaves sufficient porosity for lithium plating. |

One or more embodiments of the invention have found that while Li plating into pores has a lower overpotential, it can also have low $\eta_C$. However, a compressible structure may enhance $\eta_C$ (as used herein, $\eta_C$ refers to Coulombic efficiency).

The negative electrode performance measured in FIGS. 7-9 can be enhanced by the application of pressure during stripping and/or the use of a springy anode structure (e.g., carbon mat 414) or nanoparticles 210 as the host material for the Pt and the Li. Such springy anode structures can act as a sponge, absorbing Li with reduced swelling. As a result, one or more embodiments of the invention can successfully implement an SSE that works with a porous anode structure which was not possible in conventional architectures.

Positive Electrode (Cathode) Structures

The negative electrode (anode) structure according to one or more embodiments of the invention can be used in a high energy density rechargeable Li ion battery wherein the cathode comprises a chemical conversion material that de-intercalates and intercalates Li via a solid state chemical conversion reaction in the solid state [1]. For example, in the discharged state, the conversion material can include a metal or metal alloy component (e.g., iron) and a Li compound component (e.g., Lithium Fluoride salt (LiF)). In a charged state, the metal component is converted to, e.g., nanodimensioned iron trifluoride (FeF$_3$), providing Li ions that diffuse through the electrolyte and providing electrons to the external circuit. Thus, the conversion material can reversibly convert between the charged and discharged states via the conversion reaction.

Use of a Li metal anode in conjunction with such a cathode can enhance the energy difference between charged and discharged states, leading to higher energy density batteries. The battery can be an all solid state battery.

Possible Modifications

One or more embodiments of the invention, including Examples 1-4, could be modified as follows.

The CC layer can comprise a metal selected from the group consisting of copper (Cu), aluminum (Al), nickel (Ni), stainless steel, alloys thereof, coating(s) thereof upon another material, and combinations thereof. For example, the coating(s) can comprise metal such as Ni and/or Cu and the another material can be a polymer (e.g., a polyimide sheet).

The SSE can comprise garnet, PEO, LSPS, eLSPS, LSTPS, LSTPSO, LPS, LPSO, eLPSO, eLPS, or LSS, LATP (Li—Al—Sn—P including material), LAGP (Li—Al—Ga—P including material) solid polymer electrolyte, polymer/ceramic composites, and a lithium stuffed garnet, for example.

The percolating network can comprise carbon nanowires, carbon mat, carbon mesh, carbon foam, and/or expanded metal mesh.

The percolating network can comprise insulating or conducting nanowires. The (e.g., insulating) nanowires can comprise carbon nanowires, cellulosic fibers, and/or insulating oxides (e.g., Zinc Oxide (ZnO), Silicon dioxide (SiO$_2$), and/or sapphire (Al$_2$O$_3$)). The insulating nanowires can be either springy (Example 4) or stiff (Example 3).

The percolating network can comprise carbon, wherein the carbon is graphite, vapor grown carbon fiber (VGCF), ketjen black, carbon nanofibers mats, and/or carbon nanowires.

The percolating network can comprise a polymer (e.g., polymer binder) such as polyethylene oxide (PEO), polypropylene oxide (PPO), PEO-PPO block co-polymers, styrene-butadiene, polystyrene (PS), acrylates, diacrylates, methyl methacrylates, silicones, acrylamides, t-butyl acrylamide, styrenics, t-alpha methyl styrene, acrylonitriles, and vinyl acetates. In some examples, the polymer is polyethylene oxide (PEO). In some examples, the polymer ispolypropylene oxide (PPO). In some examples, the polymer is a PEO-PPO block co-polymer. In some examples, the polymer is styrene-butadiene. In some examples, the polymer is polystyrene (PS). In some examples, the polymer is an acrylate. In some examples, the polymer is a diacrylate. In some examples, the polymer is a methyl methacrylate. In some examples, the polymer is a silicone. In some examples, the polymer is an acrylamide. In some examples, the polymer is t-butyl acrylamide. In some examples, the polymer is a styrenic. In some examples, the polymer is t-alpha methyl styrene. In some examples, the polymer is an acrylonitrile. In some examples, the polymer is a vinyl acetate. In some examples, the polymer is styrene butadiene rubber (SBR), nitrile butadiene rubber (NBR), ethylene propylene rubber (EPR), PVdF, PVdF-HFP copolymer, PAA, PVA, or other binders known in the art.

The binder can bind the nanoparticles to nanowires (e.g., Examples 1-2). The binder (with or without nanoparticles) can bind the nanowires to the CC.

The percolating network can further comprise metal, such as Pt or other metal that alloys with Li (e.g., Ag, Mg, Si, Cu, Ni). For example, the nanoparticles can comprise Ag, Mg, Si, Pt, Cu, and/or Ni (e.g., FIG. 2), Ag, Mg, Si, Pt, Cu, and/or Ni can be coated on the carbon mat (e.g., FIG. 4(b)), or Ag, Mg, Si, Pt, Cu, and/or Ni can be coated on the carbon conductive network (e.g., FIG. 4(a)). The metal can be such that an overpotential of the battery is reduced by a factor of at least 4.5 as compared to without the metal.

The anode (negative electrode) can be such that a battery comprising the negative electrode has a Coulombic efficiency greater than 90%.

The liquid anolyte can be separated from the SSE and/or contained within the negative electrode by a member such as a gasket, a seal, or a membrane, etc.

The anolyte can be characterized by $\sigma_e < \sigma_{Li}$, e.g., $\sigma_e$ at least one order of magnitude lower than $\sigma_{Li}$, $\sigma_e$ at least two orders of magnitude lower than $\sigma_{Li}$, and/or $\sigma_e$ at least three orders of magnitude lower than $\sigma_{Li}$.

The battery can comprise anode, cathode, and electrolyte materials such that the battery has a capacity of greater than 300 mAh/g at less than 30 millivolts (mV) relative to a lithium electrode.

The anolyte and SSE can be characterized by a density defined in terms of a volumetric percentage of the SSE which is not pore space, i.e., an SSE with no pore space has 100% density, an anolyte with 5% pore space has 95% density The density of the SSE can be >95% and <100%; >95.5% and <100%; >96% and <100%; >96.5% and <100%; >97% and <100%; >97.5% and <100%; >98% and <100%; >98.5% and <100%; >99% and <100%; >99.5% and <100%; >95% and <99.5%; >95% and <99%; >95% and <98.5%; >95% and <98%; >95% and <97.5%; >95% and <97%; >95% and <96.5%; >95% and <96%; >95% and <95.5%; >96% and <96.5%; >96% and <97%; >96% and <97.5%; >96% and <98%; >96% and <98.5%; >96% and <99%; >96% and <99.5%; >97% and <97.5%; >97% and <98%; >97% and <98.5%; >97% and <99%; >97% and <99.5%; >98% and <98.5%; >98% and <99%; >98% and <99.5%; or >99% and <99.5%.

In one or more embodiments, a thin film battery structure is provided, comprising a cathode/layer/electrolyte/Anode/CC having a total thickness of 1-50 micrometers.

The above modifications are merely provided as examples. Other modifications are also possible.

Definitions

As used herein, an anolyte comprises a region of the anode wherein the electrolyte is (e.g., intimately) mixed and in contact with the anode active material. An "anolyte" can also refer to the liquid/gel material (electrolyte) that permeates/wets the surfaces in the negative electrode.

As used herein, "stable vs. Li" indicates that the electrolyte does not react with Li or reacts to form a thin, low impedance, passivating layer with Li, e.g., for operating voltages in a range of −0.1 V-0.5 V. The impedance growth over time of a material satisfying this definition is less than 10%/month at 50° C., and the steady-state Coulombic efficiency of a material satisfying this definition is greater than 90% when cycled at 1 mA/cm$^2$ and 50° C. for 1 hour per cycle.

As used herein the phrase "stable vs. Li," also refers to material that does not undergo a destructive chemical reaction when a voltage of more than 3.8V (or less than 1.5) relative to a Lithium reference electrode is applied thereto. A destructive chemical reaction as used herein refers to a chemical reaction that degrades the functionality of the material (e.g., polymer, liquid or gel) for which the material is used. For example, if a polymer material is ionically conductive and useful as a Li-conductor in a Li battery, then a destructive reaction is a reaction that reduces or degrades the ability of the polymer to conduct Li ions by more than 10% as measured in S/cm units of conductivity over the life of the product in useful operating conditions of temperature and cycling.

As used herein, the phrase "positive electrode" refers to the electrode in a secondary battery towards which positive ions, e.g., Li$^+$, flow or move during discharge of the battery. As used herein, the phrase "negative electrode" refers to the electrode in a secondary battery from where positive ions, e.g., Li$^+$, flow or move during discharge of the battery. In a battery comprised of a Li-metal electrode and a conversion chemistry electrode (i.e., active material; e.g., NiF$_x$), the electrode having the conversion chemistry materials is referred to as the positive electrode. In some common usages, cathode is used in place of positive electrode, and anode is used in place of negative electrode. When a Li-secondary battery is charged, Li ions move from the positive electrode (e.g., NiF$_x$) towards the negative electrode (Li-metal). When a Li-secondary battery is discharged, Li ions move toward the positive electrode (e.g., NiF$_x$; i.e., cathode) and from the negative electrode (e.g., Li-metal; i.e., anode).

As used herein, the phrase "current collector" refers to a component or layer in a secondary battery through which electrons conduct, to or from an electrode in order to complete an external circuit, and which are in direct contact with the electrode to or from which the electrons conduct. In some examples, the current collector is a metal (e.g., Al, Cu, or Ni, steel, alloys thereof, or combinations thereof) layer which is laminated to a positive or negative electrode. During charging and discharging, electrons move in the opposite direction to the flow of Li ions and pass through the current collector when entering or exiting an electrode.

As used herein, the term "electrolyte," refers to an ionically conductive and electrically insulating material. Electrolytes are useful for electrically insulating the positive and negative electrodes of a secondary battery while allowing for the conduction of ions, e.g., Li$^+$, through the electrolyte.

As used herein, the term "anolyte," refers to an ionically conductive material that is mixed with, or layered upon, or laminated to, an anode material (negative electrode material) or anode current collector.

As used herein the phrase "active electrode material," or "active material," refers to a material that is suitable for use as a Li rechargeable battery and which undergoes a chemical reaction during the charging and discharging cycles. For examples, and "active cathode material," includes a metal fluoride that converts to a metal and lithium fluoride during the discharge cycle of a Li rechargeable battery.

As used herein the term "binder," refers to a material that assists in the adhesion of another material. For example, as used herein, polyvinyl butyral is a binder because it is useful for adhering battery constituent components. Other binders include polycarbonates. Other binders may include polymethylmethacrylates. These examples of binders are not limiting as to the entire scope of binders contemplated here but merely serve as examples.

In the examples herein, wherein a binder is recited, the binder may be selected from the group consisting of polypropylene (PP), polyvinyl butyral (PVB), polyvinyl pyrrolidone (PVP), atactic polypropylene (aPP), isotactive polypropylene ethylene propylene rubber (EPR), ethylene pentene copolymer (EPC), polyisobutylene (PIB), ZEON™, styrene butadiene rubber (SBR), polyolefins, polyethylene-co-poly-1-octene (PE-co-PO); PE-co-poly(methylene cyclopentane) (PE-co-PMCP); stereoblock polypropylenes, polypropylene polymethylpentene copolymer and silicone.

As used herein, springy indicates compressible or flexible without breaking. For example, a springy anolyte has some ability to deform without degrading and maintains mechanical integrity with deformation (as compared to stiff anolytes which crack or break with moderate deformation). Springy anolyte layers are more compressible during Li stripping as compared to rigid or stiff anolytes. ≥90% of samples of a springy layer will survive when subjected to 500 cycles of ≥20% deformation.

As used herein, a percolating network is a network that conducts charge carriers from one end to the other.

As used herein, a pore space is a space into which Li can be plated and into which a liquid or gel electrolyte can wet.

References

The following references are incorporated by reference herein.

[1] U.S. Patent Publication No. 2014/0170493.

Although the foregoing embodiments have been described in some detail for purposes of clarity of understanding, it will be apparent that certain changes and modifications may be practiced within the scope of the appended claims. It should be noted that there are many alternative ways of implementing the processes, systems and apparatus of the present embodiments. Accordingly, the present embodiments are to be considered as illustrative and not restrictive, and the embodiments are not to be limited to the details given herein.

What is claimed is:

1. A negative electrode for a lithium (Li) ion secondary battery, comprising:
   a current collector (CC) layer comprising a metal selected from the group consisting of copper (Cu), aluminum (Al), nickel (Ni), stainless steel, alloys thereof, coatings thereof upon a substrate, and combinations thereof; and
   an anolyte layer between and in contact with both the CC layer and a solid state electrolyte (SSE) layer;
   wherein:
      the anolyte layer comprises a liquid or gel; and
      the anolyte layer comprises
         a percolating network of electrically conductive species, the percolating network comprising at least one member selected from the group consisting of binders, carbon, polymers, nanoparticles, nanowires, and combinations thereof, and comprising pores within the percolating network for Li deposition.

2. The negative electrode of claim 1, wherein the CC is a coating on a substrate and the coating is a metal selected from the group consisting of nickel, copper, and combinations thereof.

3. The negative electrode of claim 2, wherein the substrate is a member selected from the group consisting of a plastic substrate, a polymer substrate, a ceramic substrate, and a carbon substrate.

4. The negative electrode of claim 1, wherein the porosity of the SSE is greater than 0% and less than 5%.

5. The negative electrode of claim 1, wherein the SSE is selected from the group consisting of LSPS, eLSPS, LSTPS, LSTPSO, LPS, eLPSO, LPSO, eLPS, LSS, solid polymer electrolyte, polymer/ceramic composites, and a lithium stuffed garnet.

6. The negative electrode of claim 5, wherein the SSE is eLPS, eLSPS, or eLPSO.

7. The negative electrode of claim 1, wherein the SSE comprises a lithium stuffed garnet.

8. The negative electrode of claim 1, wherein the percolating network comprises at least one member selected from the group consisting of carbon mat, carbon mesh, carbon foam, carbon nanotubes, carbon nanofibers, carbon fibers, vapor grown carbon fibers, and expanded metal mesh.

9. The negative electrode of claim 1, wherein the percolating network comprises nanowires.

10. The negative electrode of claim 9, wherein the nanowires are carbon nanowires.

11. The negative electrode of claim 9, wherein the nanowires are insulating carbon nanowires.

12. The negative electrode of claim 9, wherein the nanowires have nanoparticles thereupon.

13. The negative electrode of claim 12, wherein the nanoparticles are Cu nanoparticles, Pt nanoparticles, Pd nanoparticles, or carbon (C) nanoparticles.

14. The negative electrode of claim 9, wherein the nanowires are insulating and are selected from the group consisting of insulating carbon nanowires, cellulosic fibers, and insulating oxides.

15. The negative electrode of claim 14, wherein the nanowires have nanoparticles thereupon and the nanoparticles are Cu nanoparticles or carbon (C) nanoparticles.

16. The negative electrode of claim 14, wherein the insulating oxide is selected from the group consisting of $ZnO$, $SiO_2$, $Al_2O_3$, and combinations thereof.

17. The negative electrode of claim 1, wherein the percolating network comprises a polymer selected from the group consisting of polyethylene oxide (PEO), polypropylene oxide (PPO), PEO-PPO block co-polymers, styrene-butadiene, polystyrene (PS), acrylates, diacrylates, methyl methacrylates, silicones, acrylamides, t-butyl acrylamide, styrenics, t-alpha methyl styrene, acrylonitriles, and vinyl acetates.

18. The negative electrode of claim 1, wherein the percolating network comprises a binder selected from the group consisting of polypropylene (PP), polyvinyl butyral (PVB), polyvinyl pyrrolidone (PVP), atactic polypropylene (aPP), isotactive polypropylene ethylene propylene rubber (EPR), ethylene pentene copolymer (EPC), polyisobutylene (PIB), styrene butadiene rubber (SBR), polyolefins, polyethylene-co-poly-1-octene (PE-co-PO), PE-co-poly(methylene cyclopentane) (PE-co-PMCP), stereoblock polypropylenes, polypropylene polymethylpentene copolymers, and silicones.

19. The negative electrode of claim 1, wherein the anolyte is characterized by an electronic conductivity ($\sigma_e$)<a Lithium conductivity ($\sigma_{Li}$).

20. The negative electrode of claim 19, wherein $\sigma_e$ is at least one order of magnitude lower than $\sigma_{Li}$.

21. The negative electrode of claim 1, wherein the liquid of the anolyte layer is contained within the negative electrode by a member selected from the group consisting of a gasket, a seal, and a membrane.

22. The negative electrode of claim 1, wherein the percolating network comprises pores and the pores have walls coated with at least one metal selected from the group consisting of platinum, nickel, copper, and combinations thereof.

23. An energy storage device comprising the negative electrode of claim 1, a cathode, and an electrolyte between the cathode and the anode such that the energy storage device has a capacity of greater than 300 mAh/g when the negative electrode is 30 millivolts (mV) relative to a lithium electrode.

24. An energy storage device comprising the negative electrode of claim 1.

25. The negative electrode of claim 1, wherein the percolating network comprises a metal that alloys with Li and the metal is Ag, Mg, Si, Pt, Cu, and/or Ni.

\* \* \* \* \*